United States Patent
Mei et al.

(10) Patent No.: US 10,054,678 B2
(45) Date of Patent: Aug. 21, 2018

(54) MINIMIZING INCORRECT SENSOR DATA ASSOCIATIONS FOR AUTONOMOUS VEHICLES

(71) Applicant: Toyota Motor Engineering & Manufacturing North America, Inc., Erlanger, KY (US)

(72) Inventors: Xue Mei, Ann Arbor, MI (US); Naoki Nagasaka, Ann Arbor, MI (US); Bunyo Okumura, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 362 days.

(21) Appl. No.: 14/813,429

(22) Filed: Jul. 30, 2015

(65) Prior Publication Data

US 2017/0031015 A1   Feb. 2, 2017

(51) Int. Cl.
| | |
|---|---|
| G01S 13/42 | (2006.01) |
| G01S 13/86 | (2006.01) |
| G01S 13/93 | (2006.01) |
| G01S 17/42 | (2006.01) |
| G01S 17/93 | (2006.01) |
| G01S 13/58 | (2006.01) |
| B60W 30/095 | (2012.01) |

(52) U.S. Cl.
CPC ....... *G01S 13/865* (2013.01); *B60W 30/0956* (2013.01); *G01S 13/42* (2013.01); *G01S 13/58* (2013.01); *G01S 13/931* (2013.01); *G01S 17/42* (2013.01); *G01S 17/936* (2013.01)

(58) Field of Classification Search
CPC .... B60W 30/0956; G01S 13/42; G01S 13/58; G01S 13/865; G01S 13/931; G01S 17/42; G01S 17/936
USPC .......................................................... 342/54
See application file for complete search history.

(56) References Cited

U.S. PATENT DOCUMENTS

| | | |
|---|---|---|
| 7,046,841 B1 | 5/2006 | Dow et al. |
| 8,027,029 B2 | 9/2011 | Lu et al. |
| 8,351,684 B2 | 1/2013 | Clar et al. |

(Continued)

OTHER PUBLICATIONS

Mertz et al.; "Moving Object Detection with Laser Scanners"; Journal of Field Robotics; 2013; pp. 17-43; vol. 30, Issue 1; 2012 Wiley Periodicals, Inc.; (27 pages).
Kovavisaruch et al.; "Accuracy Improvement Method for Vehicle Detection Using Optical Sensors"; IEEE; 2009; pp. 218-222; (5 pages).
Cho et al.; "A Multi-Sensor Fusion System for Moving Object Detection and Tracking in Urban Driving Environments"; 2014 IEEE International Conference on Robotics & Automation (ICRA); May 31 - Jun. 7, 2014; pp. 1836-1843; Hong Kong, China; (8 pages).

(Continued)

*Primary Examiner* — Timothy A Brainard
(74) *Attorney, Agent, or Firm* — Christopher G. Darrow; Darrow Mustafa PC

(57) ABSTRACT

Minimizing incorrect associations of sensor data for an autonomous vehicle are described. A driving environment of the autonomous vehicle includes a stationary object and a dynamic object. Such objects can be detected by radar sensors and/or lidar sensors. In one example, a history of radar observation can be used to minimize incorrect sensor data associations. In such case, the location of a stationary object in the driving environment can be determined. When a dynamic object passes by the stationary object, lidar data of the dynamic object is prevented from being associated with radar data obtained substantially at the determined location of the stationary object. In another example, identifiers assigned to radar data can be used to minimize incorrect sensor data associations. In such case, lidar data of an object can be associated with radar data having a particular identifier.

20 Claims, 7 Drawing Sheets

(56) References Cited

U.S. PATENT DOCUMENTS

| | | |
|---|---|---|
| 8,594,927 B2 | 11/2013 | Louis et al. |
| 8,605,998 B2 | 12/2013 | Samples et al. |
| 8,766,975 B2 | 7/2014 | Mohr et al. |
| 2013/0242284 A1 | 9/2013 | Zeng |
| 2014/0032012 A1 | 1/2014 | Joshi et al. |
| 2016/0363647 A1* | 12/2016 | Zeng .................. G01S 5/0263 |

OTHER PUBLICATIONS

Darms et al.; "Obstacle Detection and Tracking for the Urban Challenge"; IEEE Transactions on Intelligent Transportation Systems; Sep. 2009; pp. 475-485; vol. 10, No. 3; (11 pages).

Golovinskiy et al.; "Shape-baesd Recognition of 3D Point Clouds in Urban Environments"; 2009 IEEE 12th International Conference on Computer Vision (ICCV); pp. 2154-2161 (8 pages).

Mei et al.; "Detection and Motion Planning for Roadside Parked Vehicles at Long Distance"; 2015 IEEE Intelligent Vehicles Symposium; Jun. 28-Jul. 1, 2015; pp. 1-6; CEOX, Seol, Korea; (6 pages).

Felzenszwalb et al.; "Efficient Graph-Based Image Segmentation"; International Journal of Computer Vision; Sep. 2004; pp. 1-26; vol. 59, No. 2; (26 pages).

Takagi et al.; "Road Environment Recognition Using On-Vehicle Lidar"; Jan. 2006; pp. (9 pages).

* cited by examiner

200

- Acquiring a First Sensor Observation of the Forward Portion of the Driving Environment in Which the Dynamic Object is Located Away from the Stationary Object, the First Sensor Observation Including Radar Data for the Dynamic Object and the Stationary Object — 210

- Determining the Location of the Stationary Object in the Driving Environment Based on the Radar Data — 220

- Acquiring a Second Sensor Observation of the Forward Portion of the Driving Environment in Which the Dynamic Object is Located Substantially Near the Determined Location of the Stationary Object, the Second Sensor Observation Including Radar Data and Lidar Data for the Dynamic Object and the Stationary Object, the Second Sensor Observation Being Subsequent to the First Sensor Observation — 230

- For the Second Sensor Observation, Preventing the Lidar Data of the Dynamic Object from Being Associated With Radar Data Obtained Substantially at the Determined Location of the Stationary Object — 240

Acquiring a First Sensor Observation of the Forward Portion of the Driving Environment, the First Sensor Observation Including Radar Data and Lidar Data for the Dynamic Object and the Stationary Object, a First Identifier Being Assigned to the Radar Data for the Dynamic Object and a Second Identifier Being Assigned to the Radar Data for the Stationary Object — 410

For the First Sensor Observation, Associating the Lidar Data of the Dynamic Object With the Radar Data Having the First Identifier Assigned Thereto — 420

For the First Sensor Observation, Associating the Lidar Data of the Stationary Object With the Radar Data Having the Second Identifier Assigned Thereto — 430

Acquiring a Second Sensor Observation of the Forward Portion of the Driving Environment, the Second Sensor Observation Including Radar Data and Lidar Data for the Dynamic Object and the Stationary Object, the Second Sensor Observation Moment Being Subsequent to the First Sensor Observation Moment, the First Identifier Being Assigned to the Radar Data for the Dynamic Object and the Second Identifier Being Assigned to the Radar Data for the Stationary Object — 440

For the Second Sensor Observation, Associating the Lidar Data of the Dynamic Object With Only Radar Data With the First Identifier Assigned Thereto — 450

FIG. 4

MINIMIZING INCORRECT SENSOR DATA ASSOCIATIONS FOR AUTONOMOUS VEHICLES

FIELD

The subject matter described herein relates in general to vehicles having an autonomous operational mode and, more particularly, to the operation of the sensor system of such vehicles.

BACKGROUND

Some vehicles include an operational mode in which a computing system is used to navigate and/or maneuver the vehicle along a travel route with minimal or no input from a human driver. Such vehicles are equipped with sensors that are configured to detect information about the surrounding environment, including the presence of stationary and dynamic objects in the environment. Sensor data from multiple sensor types can be fused to provide a detailed understanding of the objects in the environment, including the speed of such objects. The computing systems are configured to process the detected information to determine how to navigate and/or maneuver the vehicle through the surrounding environment.

SUMMARY

In one respect, the present disclosure is directed to a method of minimizing incorrect associations of sensor data for an autonomous vehicle. The autonomous vehicle can operate in a driving environment. A stationary object and a dynamic object can be located in a forward portion of the driving environment. The method can include acquiring a first sensor observation of the forward portion of the driving environment. The dynamic object can be located away from the stationary object. The first sensor observation can include radar data for the dynamic object and the stationary object.

The method can include determining the location of the stationary object in the driving environment based on the radar data. The method can further include acquiring a second sensor observation of the forward portion of the driving environment. The dynamic object is located substantially near the determined location of the stationary object. The second sensor observation can include radar data and lidar data for the dynamic object and for the stationary object. The second sensor observation is subsequent to the first sensor observation. The method can include, for the second sensor observation, preventing the lidar data of the dynamic object from being associated with radar data obtained substantially at the determined location of the stationary object.

In another respect, the present disclosure is directed a system for minimizing incorrect associations of sensor data for an autonomous vehicle. The autonomous vehicle can operate in a driving environment. A stationary object and a dynamic object can be located in a forward portion of the driving environment. The system can include a sensor system including a radar sensor and a lidar sensor. The system can also include a processor operatively connected to the sensor system.

The sensor system can be configured to acquire a first sensor observation of a forward portion of the driving environment. The dynamic object can be located away from the stationary object. The first sensor observation can include radar data for the dynamic object and the stationary object. The sensor system can be configured to acquire a second sensor observation of the forward portion of the driving environment. The dynamic object can be located substantially near the determined location of the stationary object. The second sensor observation can include radar data and lidar data for the dynamic object and the stationary object. The second sensor observation is subsequent to the first sensor observation.

The processor can be programmed to initiate executable operations. The executable operations including, for the first sensor observation, determining the location of the stationary object in the driving environment based on the radar data. The executable operations including, for the second sensor observation, preventing the lidar data of the dynamic object from being associated with radar data obtained substantially at the determined location of the stationary object.

In yet another respect, the present disclosure is directed to a method of minimizing incorrect associations of sensor data for an autonomous vehicle. The autonomous vehicle can operate in a driving environment. A stationary object and a dynamic object can be located in a forward portion of the driving environment. The method can include acquiring a first sensor observation of the forward portion of the driving environment. The first sensor observation can include radar data and lidar data for the dynamic object and the stationary object. A first identifier can be assigned to the radar data for the dynamic object and a second identifier can be assigned to the radar data for the stationary object. The method can include, for the first sensor observation, associating the lidar data of the dynamic object with the radar data having the first identifier assigned thereto. The method can include, for the first sensor observation, associating the lidar data of the stationary object with the radar data having the second identifier assigned thereto.

The method can include acquiring a second sensor observation of the forward portion of the driving environment. The second sensor observation can include radar data and lidar data for the dynamic object and the stationary object. The second sensor observation is subsequent to the first sensor observation. The first identifier can be assigned to the radar data for the dynamic object, and the second identifier can be assigned to the radar data for the stationary object. The method can include, for the second sensor observation, associating the lidar data of the dynamic object with only radar data with the first identifier assigned thereto.

In still another respect, the present disclosure is directed to a system for minimizing incorrect associations of sensor data for an autonomous vehicle. The autonomous vehicle can operate in a driving environment. A stationary object and a dynamic object can be located in a forward portion of the driving environment. The system can include a sensor system. The sensor system can include a radar sensor and a lidar sensor. The system can also include a processor operatively connected to the sensor system.

The sensor system can be configured to acquire a first sensor observation of the forward portion of the driving environment. The first sensor observation can include radar data and lidar data for the dynamic object and the stationary object. A first identifier can be assigned to the radar data for the dynamic object, and a second identifier can be assigned to the radar data for the stationary object.

The sensor system can be configured to acquire a second sensor observation of the forward portion of the driving environment. The second sensor observation can include radar data and lidar data for the dynamic object and the stationary object. The second sensor observation is subsequent to the first sensor observation. The first identifier can be assigned to the radar data for the dynamic object, and the second identifier can be assigned to the radar data for the stationary object.

The processor can be programmed to initiate executable operations. The executable operations can include, for the first sensor observation, associating the lidar data of the dynamic object with the radar data having the first identifier assigned thereto. The executable operations can include, for the first sensor observation, associating the lidar data of the stationary object with the radar data having the second identifier assigned thereto. The executable operations can include, for the second sensor observation, associating the lidar data of the dynamic object with only radar data with the first identifier assigned thereto.

BRIEF DESCRIPTION OF THE DRAWINGS

FIG. 2 is an example of a first method of minimizing incorrect associations of sensor data for an autonomous vehicle.

FIG. 4 is an example of a second method of minimizing incorrect associations of sensor data for an autonomous vehicle.

DETAILED DESCRIPTION

Figure 1:
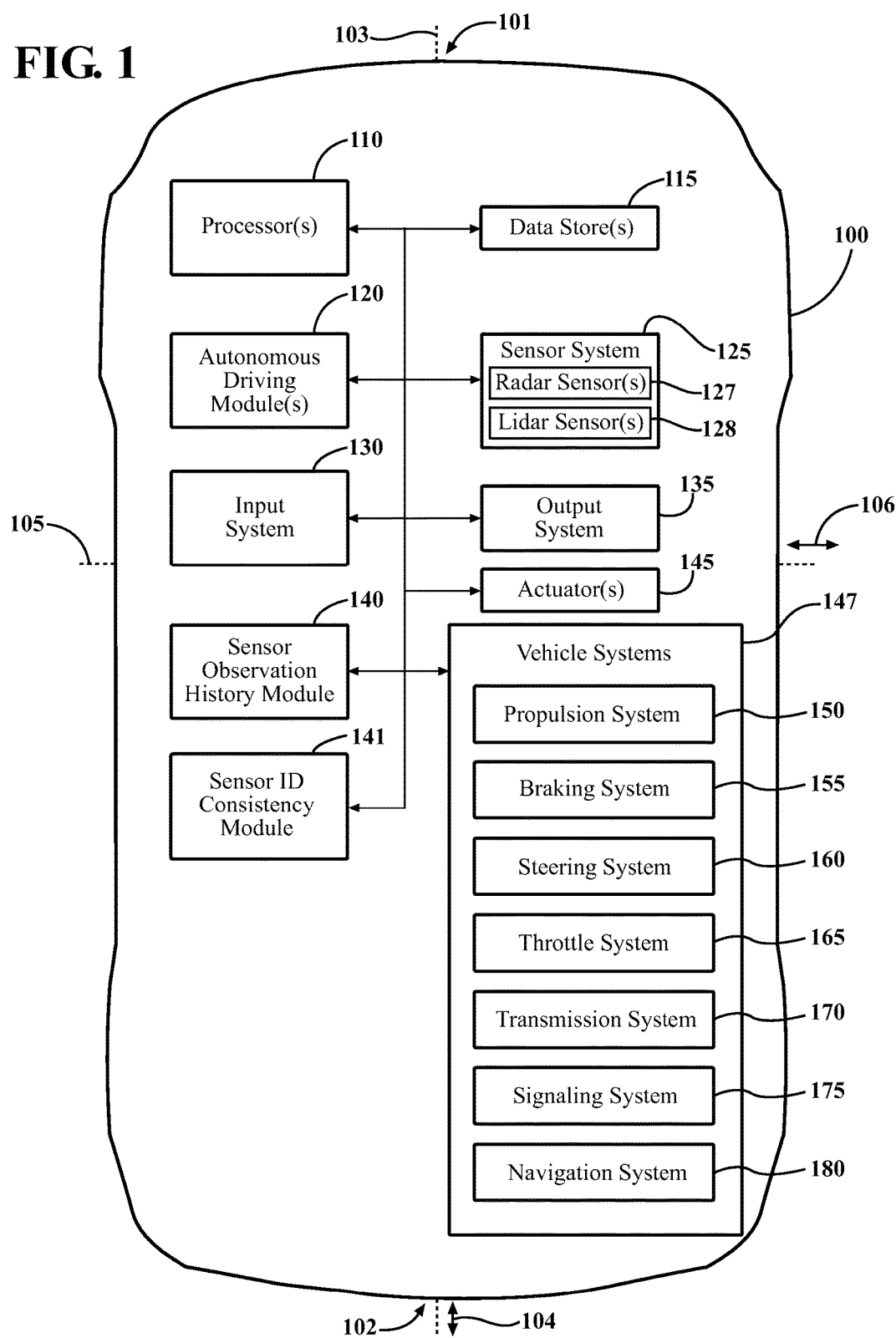
FIG. 1 is an example of an autonomous vehicle configured to minimize incorrect associations of sensor data.

This detailed description relates to minimizing incorrect associations of sensor data for a driving environment of an autonomous vehicle. More particularly, the detailed description relates to minimizing incorrect associations of sensor data (e.g., speed data) of stationary objects with sensor data of a dynamic object. A forward portion of the driving environment can be sensed using one or more radar sensors and/or one or more lidar sensors. Various methods of minimizing incorrect associations between the lidar sensor data and the radar sensor data can be implemented.

In one method, a history of radar observations can be used to minimize incorrect sensor data associations. In such method, the location of a stationary object in the driving environment can be determined based on radar data acquired during a first sensor observation in which the dynamic object is located away from the stationary object. During a second, subsequent sensor observation of the driving environment, the dynamic object can be located substantially near the determined location of the stationary object. For the second sensor observation, the lidar data of the dynamic object can be prevented from being associated with radar data obtained substantially at the determined location of the stationary object.

In another method, unique identifiers can be assigned to radar data for each object detected in the driving environment. For instance, a first identifier can be assigned to radar data for a dynamic object, and a second identifier to the radar data for a stationary object. The same identifiers can be assigned to the same objects over a plurality of sensor observations. For a first sensor observation, the lidar data of the dynamic object can be associated with the radar data having the first identifier assigned thereto, the lidar data of the stationary object can be associated with the radar data having the second identifier assigned thereto. At a second, subsequent sensor observation, the first identifier can be assigned to the radar data for the dynamic object, and the second identifier can be assigned to the radar data for the stationary object. For the second sensor observation, the lidar data of the dynamic object can be associated with only radar data with the first identifier assigned thereto The present detailed description relates to systems, methods and computer program products that incorporate such features. In at least some instances, such systems, methods and computer program products can improve safety and/or performance of an autonomous vehicle.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

According to arrangements herein, the vehicle 100 can be an autonomous vehicle. As used herein, "autonomous vehicle" means a vehicle that configured to operate in an autonomous mode. "Autonomous mode" means that one or more computing systems are used to navigate and/or maneuver the vehicle along a travel route with minimal or no input from a human driver. In one or more arrangements, the vehicle 100 can be highly automated. In some instances, the vehicle 100 can be configured to be selectively switched between an autonomous mode and a manual mode. Such switching can be implemented in any suitable manner, now known or later developed. "Manual mode" means that a majority of the navigation and/or maneuvering of the vehicle along a travel route is performed by a human driver.

The vehicle 100 can have a forward end 101 and a rearward end 102. The vehicle 100 can have an associated longitudinal axis 103, which can be the central axis of the vehicle 100. The vehicle 100 can have an associated longitudinal direction 104. "Longitudinal direction" means any direction that is substantially parallel to and/or co-linear with the longitudinal axis 103. The vehicle 100 can have an associated lateral axis 105, which can be substantially perpendicular to the longitudinal axis 103. As used herein, the term "substantially" includes exactly the term it modifies and slight variations therefrom. Thus, the term "substantially perpendicular" means exactly perpendicular and slight variations therefrom. In this particular example, slight variations therefrom can include within normal manufacturing tolerances, within about 10 degrees or less, within about 5 degrees or less, within about 4 degrees or less, within about 3 degrees or less, within about 2 degrees or less, or within about 1 degree or less. The vehicle 100 can have an associated lateral direction 106. "Lateral direction" means any direction that is substantially parallel to and/or co-linear with the lateral axis 105.

The vehicle 100 can include various elements, some of which may be a part of an autonomous driving system. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include one or more processors 110. "Processor" means any component or group of components that are configured to execute any of the processes described herein or any form of instructions to carry out such processes or cause such processes to be performed. The processor 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor 110 can be a main processor of the vehicle 100. For instance, the processor 110 can be an engine control unit (ECU).

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor 110, or the data store 115 can be operatively connected to the processor 110 for use thereby. The term "operatively connected," as used throughout this description, can include direct or indirect connections, including connections without direct physical contact.

The vehicle 100 can include an autonomous driving module 120. The autonomous driving module 120 can be implemented as computer readable program code that, when executed by a processor, implement various processes described herein, including, for example, determining a travel route for the autonomous vehicle, determining one or more driving maneuvers for the autonomous vehicle, implementing a determined travel route or driving maneuver, and/or causing a determined travel route or driving maneuver to be implemented. The autonomous driving module 120 can be a component of the processor 110, or the autonomous driving module 120 can be executed on and/or distributed among other processing systems to which the processor 110 is operatively connected.

The autonomous driving module 120 can include instructions (e.g., program logic) executable by the processor 110. Such instructions can include instructions to execute various vehicle functions and/or to transmit data to, receive data from, interact with, and/or control the vehicle 100 or one or more systems thereof (e.g. one or more of vehicle systems 147). Alternatively or in addition, the data store 115 may contain such instructions.

The vehicle 100 can include a sensor system 125. The sensor system 125 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 125 includes a plurality of sensors, the sensors can work independently from each other. Alternatively, two or more of the sensors can work in combination with each other. In such case, the two or more sensors can form a sensor network. The sensor system 125 and/or the one or more sensors can be operatively connected to the processor 110, the data store 115, the autonomous driving module 120 and/or other element of the vehicle 100. The sensor system 125 can be used to take one or more sensor observations of at least a portion of the driving environment of the vehicle 100. As used herein, "sensor observation" means one or more sensors of a sensor system are used to acquire sensor data of at least a portion of a driving environment of a vehicle in a moment of time or within a period of time.

The sensor system 125 can include any suitable type of sensor. For example, the sensor system 125 can include one or more sensors configured to detect, determine, assess, monitor, measure, quantify and/or sense information about the vehicle 100. Alternatively or in addition, the sensor system 125 can include one or more sensors configured to detect, determine, assess, monitor, measure, quantify and/or sense information about the external environment in which the vehicle 100 is located, including information about objects in the external environment. Such objects may be stationary objects and/or dynamic objects. Alternatively or in addition to one or more of the above examples, the sensor system 125 can include one or more sensors configured to detect, determine, assess, monitor, measure, quantify and/or sense the location of the vehicle 100 and/or the location of objects in the environment relative to the vehicle 100. Various examples of these and other types of sensors will be described herein. It will be understood that the embodiments are not limited to the particular sensors described.

The sensor system 125 can include one or more sensors configured to detect, determine, assess, monitor, measure, quantify and/or sense position and orientation changes of the vehicle 100, such as, for example, based on inertial acceleration. In one or more arrangements, the sensor system 125 can include accelerometers, gyroscopes and/or other suitable sensors. The sensor system 125 can include sensors that can monitor one or more internal systems of the vehicle 100 (e.g., an $O_2$ monitor, a fuel gauge, an engine oil temperature, coolant temperature, etc.).

The sensor system 125 can include one or more sensors configured to sense the external environment of the vehicle 100. Such environment sensors can be configured to detect, determine, assess, monitor, measure, quantify and/or sense objects in at least a portion of the external environment of the vehicle 100 and/or information/data about such objects. Various examples of such sensors will be described herein. However, it will be understood that the embodiments are not limited to the particular sensors described.

In one or more arrangements, the sensor system 125 can include one or more radar sensors 127. "Radar sensor" means any device, component and/or system that can detect, determine, assess, monitor, measure, quantify and/or sense something using at least in part radio signals. The one or more radar sensors 127 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 104, the lateral direction 106 and/or other direction(s)), the elevation of each detected object, the speed of each detected object and/or the movement of each detected object. The one or more radar sensors 127, or data obtained thereby, can determine the speed of objects in the external environment of the vehicle 100. The one or more radar sensors 127 can have three dimensional coordinate data associated with it the objects. However, in some instances, the one or more radar sensors 127 may lack horizontal accuracy.

In one or more arrangements, the sensor system 125 can include one or more lidar sensors 128. "Lidar sensor" means any device, component and/or system that can detect, determine, assess, monitor, measure, quantify and/or sense something using at least in part lasers. For instance, the one or more lidar sensors 128 can be or can be included as part of a laser rangefinder or a lidar. Such devices can include a laser source and/or laser scanner configured to emit a laser and a detector configured to detect reflections of the laser. The laser rangefinder or lidar may be configured to operate in a coherent or an incoherent detection mode.

The one or more lidar sensors 128 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 104, the lateral direction 106 and/or other direction(s)), the elevation of each detected object, the speed of each detected object, and/or the movement of each detected object.

Alternatively or in addition to any of the sensors described above, the sensor system 125 can include other types of sensors. As an example, the sensor system 125 can include one or more ultrasonic sensors (not shown). The sensor system 125, the processor 110, and/or one or more other elements of the vehicle 100 can be operable to control movements of one or more of the sensors of the sensor system 125. It should be noted that any of the sensors described herein can be provided in any suitable location with respect to the vehicle 100. For instance, one or more sensors can be located within the vehicle 100, one or more sensors can be located on the exterior of the vehicle and/or one or more sensors can be located so as to be exposed to the exterior of the vehicle 100. In one or more arrangements, the one of more of the radar sensors 127 and one or more of the lidar sensors 128 can be operatively positioned to sense a forward portion of the external environment of the vehicle 100. "Forward portion" means a portion of the external environment that is located in front of the vehicle in the travel direction of the vehicle. Similarly, "forward object" means an object in the external environment that is located in front of the vehicle in the travel direction of the vehicle.

The vehicle 100 can include an input system 130. An "input system" is defined as any device, component, system, element or arrangement or groups thereof that enable information/data to be entered into a machine. The input system 130 can receive an input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 135. An "output system" is defined as any device, component, system, element or arrangement or groups thereof that enable information/data to be presented to a vehicle occupant (e.g. a person, a vehicle occupant, etc.). The output system 135 can present information/data to a vehicle occupant. The output system 135 can include a display, as described above. Alternatively or in addition, the output system 135 may include a microphone, earphone and/or speaker. Some components of the vehicle 100 may serve as both a component of the input system 130 and a component of the output system 135.

The vehicle 100 (e.g., the sensor system 125, the processor 110, and/or other module) can be configured to associate data obtained by the one or more lidar sensors 128 (e.g., point data, point clusters) with data obtained by data obtained by the radar sensors 127. Such association of the sensor data can provide more complete information about the driving environment and the objects therein. The association can be made based on or more suitable factors. For example, the association can be made if the data points obtained by the lidar sensor(s) 128 and the observations of the radar sensor(s) 127 are located within a predetermined distance from each other.

However, in some instances, the sensor data from one object in the environment may become incorrectly associated with another object in the environment, particularly when the objects are located closed to each other and/or if one of the objects is relatively thin. Such incorrect associations can arise due to, for example, the lateral inaccuracy of radar sensors. Such incorrect associations may be problematic in at least some instances. For example, when the speed of a stationary object is incorrectly associated with a dynamic object, it can cause an autonomous vehicle to misinterpret the driving environment. One instance in which such incorrect association can occur is when a dynamic object (e.g., a vehicle) is located close to a stationary object (e.g., a traffic sign, a pole, or a thin metal static object). In such case, the speed of the stationary object, as determined by data from the radar sensors 127, can become incorrectly associated with the lidar data (e.g., points or point clusters) of the dynamic object when the dynamic object is located near the stationary object. As a result, a dynamic object may be incorrectly determined as being stationary or moving at a slow speed. Such a determination can, in turn, adversely affect vehicle performance. For instance, the vehicle 100 may determine that hard braking or reducing speed is needed to avoid a perceived collision with the object when there is actually no imminent threat of collision.

According to arrangements described herein, the vehicle 100 can be configured to minimize such incorrect associations. Such incorrect associations can be minimized in various ways, as will be described herein. In one or more arrangements, the vehicle 100 can include one or more modules to minimize such incorrect associations. Some examples of such modules will be described herein.

The vehicle 100 can include a sensor observation history module 140. The sensor observation history module 140 can be implemented as computer readable program code that, when executed by a processor, implement the various processes described herein. The sensor observation history module 140 can be a component of the processor 110, or the sensor observation history module 140 can be executed on and/or distributed among other processing systems to which the processor 110 is operatively connected.

The sensor observation history module 140 can be configured to analyze data obtained by the sensor system 125 about the driving environment. In particular, the sensor observation history module 140 can be configured to analyze data obtained by at least the radar sensor(s) 127. The sensor observation history module 140 can determine the presence, the speed, and/or the location of a stationary object in the forward portion of the driving environment based on data obtained by the radar sensor(s) 127. The sensor observation history module 140 can also determine the presence and/or location of the stationary object based on the data obtained by other sensors of the sensor system 125 (e.g., the lidar sensor(s) 128).

The sensor observation history module 140 can be configured to mark or note the position of the stationary object in the driving environment to indicate that there is a stationary object at that position. For subsequent sensor observations in which the dynamic object is located substantially near the determined location of the stationary object, the sensor observation history module 140 can be configured to prevent the lidar data of the dynamic object from being associated with radar data (e.g., speed data) obtained substantially at the determined location of the stationary object. "Substantially near" means adjacent to or within a predetermined distance. In one or more arrangements, the predetermined distance means about 20 feet or less, about 15 feet or less, about 10 feet or less, or about 5 feet or less, just to name a few possibilities. In one or more arrangements, the predetermined distance can be the horizontal resolution of the radar sensor(s) 127. The sensor observation history module 140 can use the prior data from the history of one or more prior sensor observations of the stationary object.

Alternatively or in addition, the vehicle 100 can include sensor identifier consistency module 141. The sensor identifier consistency module 141 can be implemented as computer readable program code that, when executed by a processor, implement the various processes described herein. The sensor identifier consistency module 141 can be a component of the processor 110, or the sensor identifier consistency module 141 can be executed on and/or distributed among other processing systems to which the processor 110 is operatively connected.

The sensor identifier consistency module 141 can be configured to analyze data obtained by the sensor system 125 of the driving environment over a plurality of detection moments. In particular, the sensor identifier consistency module 141 can be configured to analyze data obtained by the radar sensor(s) 127 and the lidar sensor(s) 128. The sensor identifier consistency module 141 can be configured to assign an identifier to the radar data for each object detected in the driving environment, including stationary objects and/or dynamic objects. The sensor identifier consistency module 141 can be a part of the sensor system 125 and/or the radar sensor(s) 127. The identifiers can be unique for each object. The sensor identifier consistency module 141 can be configured to assign the same identifier to the same object over a plurality of sensor observations.

The sensor identifier consistency module 141 can be configured to, for a given sensor observation, associate the lidar data of an object with radar data for an object. As an example, the sensor identifier consistency module 141 can be configured to, for a given sensor observation, associate the lidar data of the stationary object with radar data only if the radar data has a particular identifier assigned thereto. Likewise, the sensor identifier consistency module 141 can be configured to, for a given sensor observation, associate the lidar data of the dynamic object with radar data only if the radar data has a particular identifier assigned thereto.

In some arrangements, the sensor system 125 and/or the processor 110 can be configured to detect, determine, assess, monitor, measure, quantify and/or sense, directly or indirectly, one or more aspects, characteristics and/or properties of a detected object. For example, the sensor system 125 and/or the processor 110 can be configured to detect, determine, assess, monitor, measure, quantify and/or sense, directly or indirectly, the size, relative size, length, width, height, a dimension, the material, a material property, the speed, the acceleration and/or the trajectory of a detected object. In one or more arrangements, one or more artificial or computational algorithms or machine learning methods can be used for such purposes.

The vehicle 100 can include one or more other modules. Such modules can be implemented as computer readable program code that, when executed by a processor, implement the various processes described herein. The modules can be a component of the processor 110, or the modules can be executed on and/or distributed among other processing systems to which the processor 110 is operatively connected. Various suitable modules can be included. Non-limiting examples of such modules will now be described.

The vehicle 100 can include a ground point filtering module. The ground point filtering module can be configured to filter data collected by the sensor system 125 to remove data corresponding to the ground. The ground point filtering module can be operatively connected to the one or more terrain data libraries to obtain terrain data for the driving environment of the vehicle, including a forward portion of the driving environment.

The vehicle 100 can include an obstacle candidate identification module. The obstacle candidate identification module can be configured to analyze data collected by the sensor system 125, such as the lidar sensor(s) 128, to group object data points together to determine obstacle candidates. The obstacle candidate identification module can be configured to use any suitable grouping technique. As an example, the obstacle candidate identification module can be configured to use one or more segmentation techniques, such as a graph-based segmentation algorithm. Some examples of suitable techniques to segment three dimensional point clouds into clusters are described in an article entitled "Efficient Graph-Based Image Segmentation" by P. Felzenszwalb et al., which is incorporated herein by reference. In one or more arrangements, such analyzing can be performed after the data points have been filtered by the ground point filtering module.

The vehicle 100 can include a location-based obstacle filtering module. The location-based obstacle filtering module can be configured to filter the obstacle candidates, as identified by the obstacle candidate identification module, to remove obstacle candidates that are not located in a particular location (e.g., on a road or sufficiently close to a road). The location-based obstacle filtering module can be operatively connected to the one or more map data libraries to obtain map data for the driving environment of the vehicle, including a forward portion of the driving environment. The obstacle candidates can be compared to the map data from the map data libraries. If an obstacle candidate is not located on a road and/or is not located sufficiently close to a road, then the obstacle candidate can be filtered. If an obstacle candidate is located on a road and/or if it is located sufficient close to a road, then the obstacle candidate is not filtered. Further analysis of such obstacle candidates can be performed.

The vehicle 100 can include an object speed filtering module. The object speed filtering module can be configured to associate speed data with the one or more obstacle candidates. Such speed data can be obtained from any suitable source, such as the sensor system 125 and, more particularly, the one or more radar sensors 127. The object speed filtering module can be configured to filter the obstacle candidates to remove obstacle candidates that are moving at or above a predetermined speed threshold. The predetermined speed threshold can have any suitable value. As an example, the predetermined speed threshold can be about 1 meter per second. However, it will be understood that other values are possible.

In one or more arrangements, the autonomous driving module 120, the ground point filtering module, the obstacle candidate identification module, the obstacle filtering module, the object speed filtering module, and/or the processor 110 can be configured to analyze information/data captured by the sensor system 125 with respect to objects located in a forward portion of the external environment of the vehicle 100. For instance, one or more of the modules can analyze information/data captured by the sensor system 125 to determine whether the detected objects are objects of interest. In one or more arrangements, an object of interest is a substantially stationary object that is located on or sufficiently near a road. In one or more arrangements, an object of interest can be a parked or stationary vehicle on or along the side of a road.

The vehicle 100 can include one or more vehicle systems 147. Various examples of the one or more vehicle systems 147 are shown in FIG. 1. However, the vehicle 100 can include more, fewer or different systems. It should be appreciated that although particular vehicle systems are separately defined, each or any of the systems or portions thereof may be otherwise combined or segregated via hardware and/or software within the vehicle 100.

The vehicle 100 can include a propulsion system 150, a braking system 155, a steering system 160, throttle system 165, a transmission system 170, a signaling system 175, and/or a navigation system 180. Each of these systems will be described in turn below.

The propulsion system 150 can include one or more mechanisms, devices, elements, components, systems, and/or combinations thereof, now known or later developed, configured to provide powered motion for the vehicle 100. The braking system 155 can include one or more mechanisms, devices, elements, components, systems, and/or combinations thereof, now known or later developed, configured to decelerate the vehicle 100. The steering system 160 can include one or more mechanisms, devices, elements, components, systems, and/or combinations thereof, now known or later developed, configured to adjust the heading of the vehicle 100. The throttle system 165 can include one or more mechanisms, devices, elements, components, systems, and/or combinations thereof, now known or later developed, configured to control the operating speed of an engine/motor of the vehicle 100 and, in turn, the speed of the vehicle 100.

The transmission system 170 can include one or more mechanisms, devices, elements, components, systems, and/or combinations thereof, now known or later developed, configured to transmit mechanical power from the engine/motor of the vehicle 100 to wheels or tires of the vehicle 100. The signaling system 175 can include one or more mechanisms, devices, elements, components, systems, and/or combinations thereof, now known or later developed, configured to provide illumination for the driver of the vehicle 100 and/or to provide information with respect to one or more aspects of the vehicle 100.

The navigation system 180 can include one or more mechanisms, devices, elements, components, systems, applications and/or combinations thereof, now known or later developed, configured to determine the geographic location of the vehicle 100 and/or to determine a travel route for the vehicle 100. The navigation system 180 can include one or more mapping applications to determine a travel route for the vehicle 100. The navigation system 180 can include a global positioning system, a local positioning system or a geolocation system.

The processor 110 and/or the autonomous driving module 120 can be operatively connected to communicate with the various vehicle systems 147 and/or individual components thereof. For example, returning to FIG. 1, the processor 110 and/or the autonomous driving module 120 can be in communication to send and/or receive information from the various vehicle systems 147 to control the movement, speed, maneuvering, heading, direction, etc. of vehicle 100. The processor 110 and/or the autonomous driving module 120 may control some or all of these vehicle systems 147 and, thus, may be partially or fully autonomous.

The processor 110 and/or the autonomous driving module 120 may be operable to control the navigation and/or maneuvering of the vehicle 100 by controlling one or more of the vehicle systems 147 and/or components thereof. For instance, when operating in an autonomous mode, the processor 110 and/or the autonomous driving module 120 can control the direction and/or speed of the vehicle 100. The processor 110 and/or the autonomous driving module 120 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 145. The actuators 145 can be any element or combination of elements operable to modify, adjust and/or alter one or more of the vehicle systems 147 or components thereof to responsive to receiving signals or other inputs from the processor 110 and/or the autonomous driving module 120. Any suitable actuator can be used. For instance, the one or more actuators 145 can include motors, pneumatic actuators, hydraulic pistons, relays, solenoids, and/or piezoelectric actuators, just to name a few possibilities.

According to arrangements described herein, the vehicle 100 can be configured to sense a forward portion of the external environment. More particularly, the vehicle 100 can sense a forward portion of the external environment using the sensor system 125. The data collected by the sensor system 125 can be processed (e.g., filtering, grouping, etc.) to determine one or more objects of interest in the forward portion of the external environment. In one or more arrangements, the vehicle 100 can be configured to detect stationary objects (e.g., vehicles parked or otherwise stationary) located or, near, and/or along a road. In one or more arrangements, the vehicle 100 can be configured to detect dynamic objects (e.g., moving vehicles) located or, near, and/or along a road. The vehicle 100 can take into account such objects with respect to determining driving maneuvers.

Now that the various potential systems, devices, elements and/or components of the vehicle 100 have been described, various methods of operating an autonomous vehicle will now be described. Referring now to FIG. 2, an example of a first method of minimizing incorrect associations of sensor data for an autonomous vehicle is shown. The autonomous vehicle can be operating in a driving environment. The driving environment can include a stationary object and a dynamic object. The stationary object can be an object with a speed of zero or near zero (e.g., 2 miles per hour or less, 1 mile per hour or less, etc.). The dynamic object can be any object that is moving. The movement can be in one more directions. In one or more arrangements, the stationary object can be a thin object. Alternatively or in addition, the stationary object can be a metal object. As an example, the stationary object can be a pole or a traffic sign. The stationary object and the dynamic object can be located in a forward portion of the driving environment.

Various possible steps of method 200 will now be described. The method 200 illustrated in FIG. 2 may be applicable to the embodiments described above in relation to FIG. 1, but it is understood that the method 200 can be carried out with other suitable systems and arrangements. Moreover, the method 200 may include other steps that are not shown here, and in fact, the method 200 is not limited to including every step shown in FIG. 2. The steps that are illustrated here as part of the method 200 are not limited to this particular chronological order. Indeed, some of the steps may be performed in a different order than what is shown and/or at least some of the steps shown can occur simultaneously.

At block 210, a first sensor observation of the forward portion of the driving environment can be acquired. The dynamic object can be located away from the stationary object. For instance, the acquired first sensor observation can include radar data for the dynamic object and the stationary object. In one or more arrangements, at least the radar sensor(s) 127 can be used to acquire the first sensor observation. The method can continue to block 220.

At block 220, the location of the stationary object in the driving environment based on the radar data can be determined. Such a determination can be made by the processor 110 and/or the sensor system 125. The method can continue to block 230.

At block 230, a second sensor observation of the forward portion of the driving environment can be acquired. The second sensor observation being subsequent to the first sensor observation. The dynamic object can be located substantially near the determined location of the stationary object. The second sensor observation can include radar data and lidar data for the dynamic object; the second sensor observation can include radar data and lidar data for the stationary object. At least the radar sensor(s) 127 and the lidar sensor(s) 128 can be used to acquire the second sensor observation. The method can continue to block 240.

At block 240, for the second sensor observation, the lidar data of the dynamic object can be prevented from being associated with radar data obtained substantially at the determined location of the stationary object. Such preventing can be performed by, for example, the sensor observation history module 140, the processor 110, and/or some other module.

The method 200 can end. Alternatively, the method 200 can return to block 210. As a further alternative, the method 200 can include additional and/or alternative blocks (not shown). For instance, in some instances, the method 200 can also include determining a driving maneuver for the autonomous vehicle based at least partially on the lidar data of the dynamic object that is prevented from being associated with radar data obtained substantially at the determined location of the stationary object. The driving maneuver can be determined by, for example, the autonomous driving module 120 and/or the processor 110. The driving maneuver can be any suitable maneuver or group of maneuvers. For instance, the driving maneuver can include moving the autonomous vehicle in the lateral direction 106 away from the detected object relative to the autonomous vehicle.

The method 200 can include causing the autonomous vehicle to implement the determined driving maneuver. The autonomous vehicle can be caused to implement the determined driving maneuver. The processor 110 and/or the autonomous driving module 120 can be operatively connected to one or more of the vehicle systems 147 to implement the determined driving maneuver. In one or more arrangements, the processor 110 and/or the autonomous driving module 120 can be operable to control the one or more actuators 145, which can control one or more of the vehicle systems 147 or portions thereof to implement the determined driving maneuver.

Non-limiting examples of the operation of the vehicle in accordance with the method 200 will now be described in relation to FIGS. 3A-3B. For purposes of these examples, the vehicle 100 can be traveling in a driving environment 300. The vehicle 100 can be traveling on a road 310. "Road" means a thoroughfare, route, path or way between two places and upon which a vehicle can travel. The road 310 may be paved or otherwise improved to facilitate travel by a vehicle thereon. In some instances, the road 310 may be unpaved or undeveloped. The road 305 may be a public road or a private road. The road 310 can include or be a part of one or more bridges, tunnels, supporting structures, junctions, crossings, interchanges, and toll roads.

A dynamic object (e.g., another vehicle 320) can be located on the road 310 forward of the vehicle 100. The other vehicle 320 can be traveling at the substantially the same speed as the vehicle 100, at a greater speed than the vehicle 100, or at a lesser speed than the vehicle 100. There can be a stationary object located in the driving environment 300 forward of the vehicle 100. In some instances, the stationary object can be a thin, metal object. As an example, the stationary object can be a traffic sign or pole 330. However, arrangements described herein are not limited to any particular type of stationary object or any particular characteristics of the stationary object.

Figure 3A:
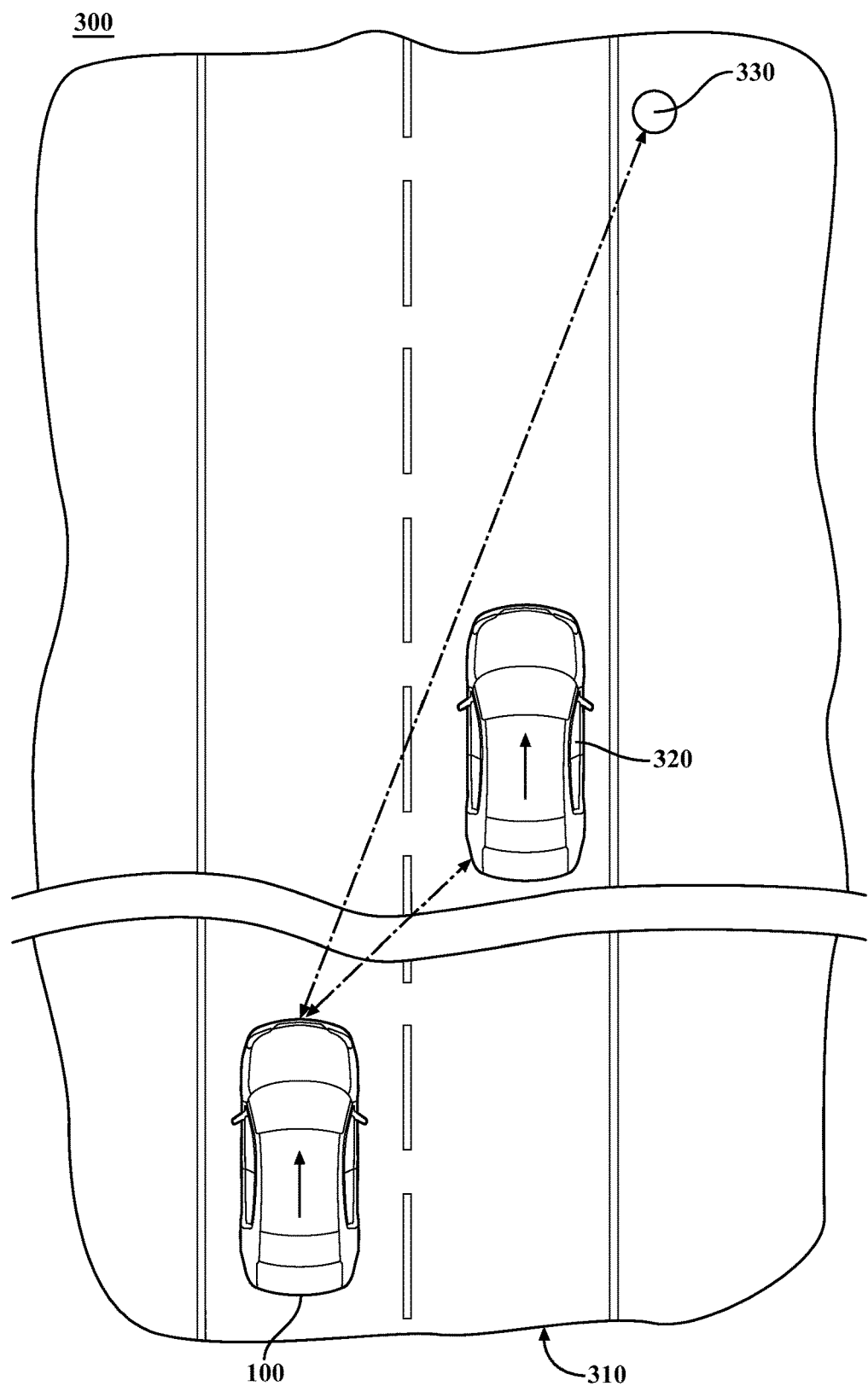
FIG. 3A is an example of a driving environment during a first sensor observation for an autonomous vehicle, showing a dynamic object being located away from the stationary object.

FIG. 3A shows the driving environment when a first sensor observation is acquired. The first sensor observation can be acquired by the sensor system 125. The vehicle 100 can sense a forward portion of the driving environment 300 that includes the pole 330 and the other vehicle 320. The other vehicle 320 is located away from the pole 330. In this regard, "located away from" means that the spacing between two objects is greater than the horizontal scanning accuracy of the radar sensor. The first sensor observation can be performed using one or more radar sensors 127. The first sensor observation can include radar data for the dynamic object and the stationary object. In some instances, the first sensor observation can also be performed using one or more lidar sensors 128.

The presence, location, and/or the speed of the pole 330 can be determined based on radar data obtained by the one or more radar sensors 127. Here, the pole 330 is stationary; therefore, its speed is zero.

Figure 3B:
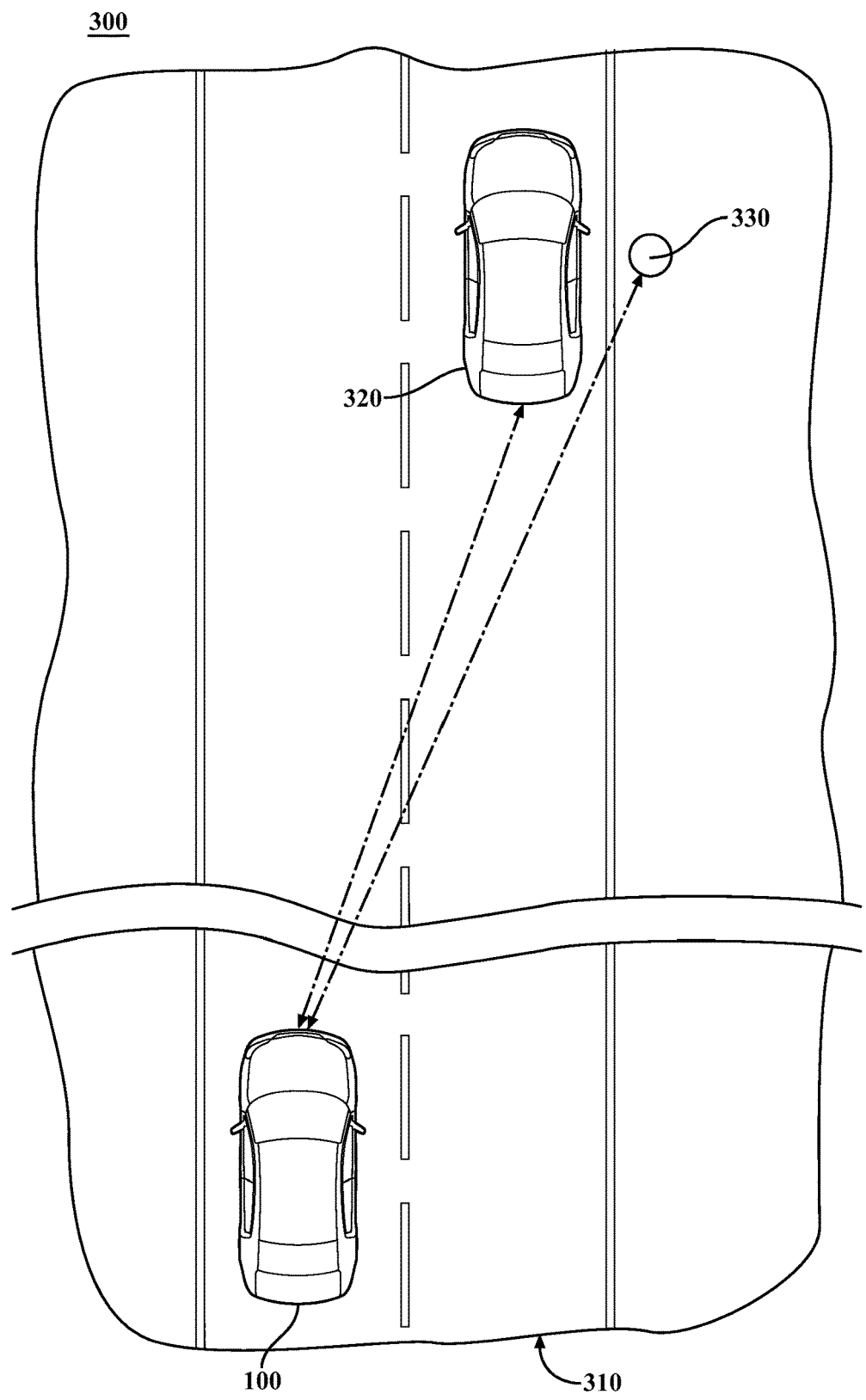
FIG. 3B is an example of the driving environment during a second subsequent sensor observation for the autonomous vehicle, showing the dynamic object being located substantially near the stationary object.

FIG. 3B shows the driving environment 300 when a second sensor observation is acquired. The second sensor observation can occur subsequent to the first sensor observation. The second sensor observation can be acquired by the sensor system 125. The vehicle 100 can sense a forward portion of the driving environment 300 that includes the pole 330 and the other vehicle 320. The other vehicle 320 can be located substantially near the determined location of the stationary object. For instance, the other vehicle 320 can be passing by the pole 330. The second sensor observation can be performed using one or more radar sensors 127 and one or more lidar sensors 128. The second sensor observation can include radar data and lidar data for the dynamic object and the stationary object.

The vehicle 100 can be configured so that, for the second sensor observation, the lidar data of the dynamic object (e.g., vehicle 320) is prevented from being associated with radar data obtained substantially at the determined location of the stationary object (e.g., the pole). In this way, the radar data of the pole 330, particularly the speed of the pole 330 (zero), will not be associated with radar data of the vehicle 320. Thus, it will be appreciated that false associations between lidar and radar sensor data can be minimized.

Referring now to FIG. 4, an example of a method of minimizing incorrect associations of sensor data for an autonomous vehicle is shown. A driving environment can include a stationary object and a dynamic object located in a forward portion of the environment relative to the vehicle. In some instances, the stationary object can be a thin, metal object. However, arrangements are not limited to such a stationary object. Indeed, the stationary object can be any stationary object.

Various possible steps of method 400 will now be described. The method 400 illustrated in FIG. 4 may be applicable to the embodiments described above in relation to FIG. 1, but it is understood that the method 400 can be carried out with other suitable systems and arrangements. Moreover, the method 400 may include other steps that are not shown here, and in fact, the method 400 is not limited to including every step shown in FIG. 4. The steps that are illustrated here as part of the method 400 are not limited to this particular chronological order. Indeed, some of the steps may be performed in a different order than what is shown and/or at least some of the steps shown can occur simultaneously.

At block 410, a first sensor observation of the forward portion of the driving environment can be acquired. The first sensor observation including radar data and lidar data for the dynamic object and the stationary object. A first identifier can be assigned to the radar data for the dynamic object, and a second identifier can be assigned to the radar data for the stationary object. The first identifier is different than the second identifier. The identifiers can have any suitable form. Such assigning can be performed by the sensor identifier consistency module 141, the processor 110, the sensor system 125, and/or the one or more radar sensors 127. The method 400 can continue to block 420.

At block 420, for the first sensor observation, the lidar data of the dynamic object can be associated with the radar data having the first identifier assigned thereto. The method 400 can continue to block 430.

At block 430, for the first sensor observation, associating the lidar data of the stationary object with the radar data having the second identifier assigned thereto. The method 400 can continue to block 440.

At block 440, a second sensor observation of the forward portion of the driving environment can be acquired. The second sensor observation can include radar data and lidar data for the dynamic object and the stationary object. The second sensor observation can occur subsequent to the first sensor observation. The first identifier can be assigned to the radar data for the dynamic object, and the second identifier being assigned to the radar data for the stationary object. The method 400 can continue to block 450.

At block 450, for the second sensor observation, the lidar data of the dynamic object can be associated with only radar data with the first identifier assigned thereto. Thus, if radar data has an identifier other than the first identifier (e.g., the second identifier), then such data will not be associated with the lidar data of the dynamic object.

The method 400 can end. Alternatively, the method 400 can return to block 410. As a further alternative, the method 400 can include additional and/or alternative blocks (not shown).

Non-limiting examples of the operation of the vehicle in accordance with the method 400 will now be described in relation to FIGS. 5A-5B. For purposes of these examples, the vehicle 100 can be traveling in a driving environment 500. The vehicle 100 can be traveling on a road 510. The driving environment 500 can include a dynamic object and a stationary object. For instance, a dynamic object (e.g., another vehicle 520) can be located on the road 510 forward of the vehicle 100. There can be a stationary object (e.g., traffic sign or pole 530) located in the driving environment 500 forward of the vehicle 100. However, these particular objects are provided as examples and are not intended to be limiting.

Figure 5A:
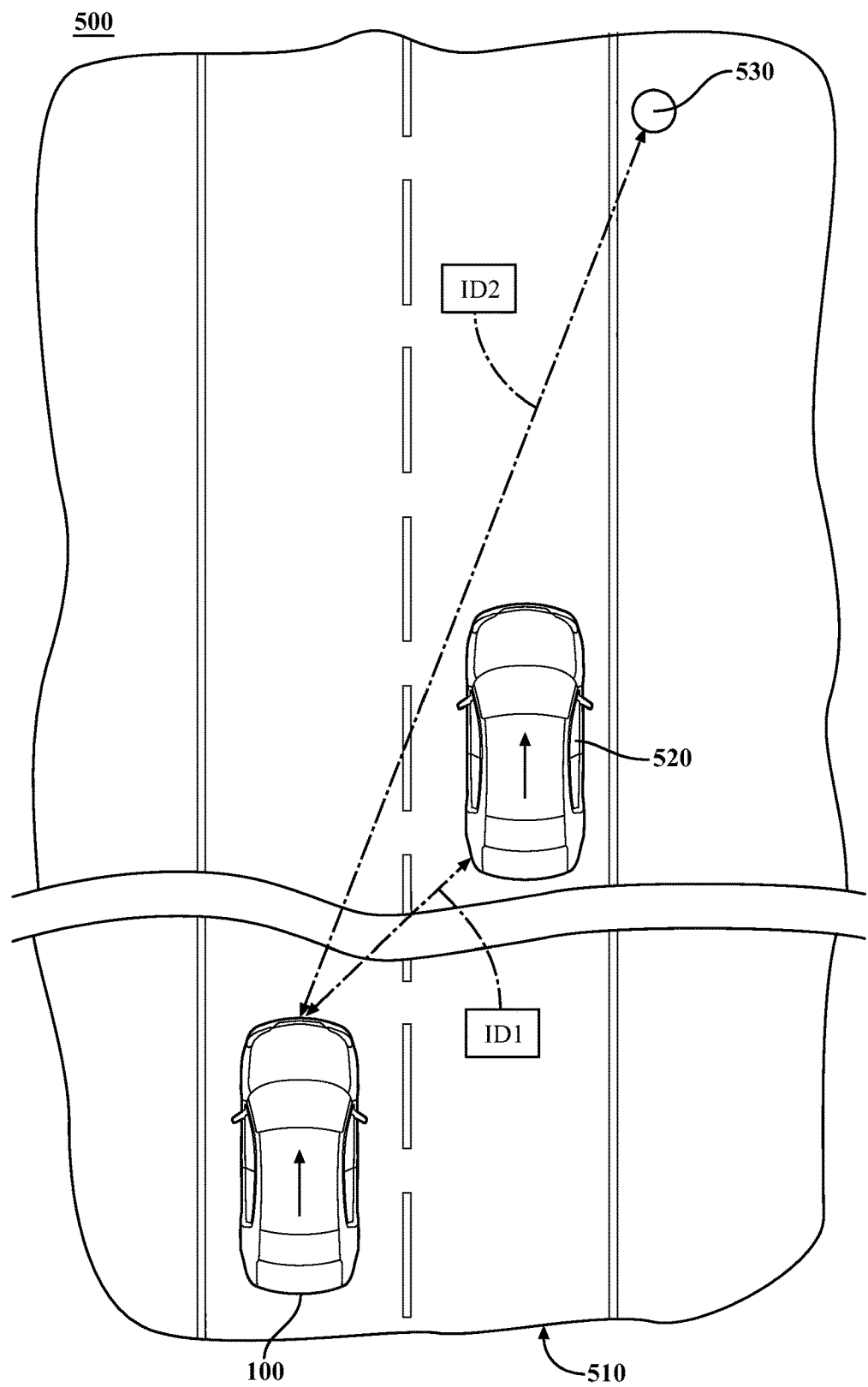
FIG. 5A is an example of a driving environment during a first sensor observation for an autonomous vehicle, wherein identifiers are assigned to stationary and dynamic objects in the driving environment.

FIG. 5A shows the driving environment 500 when a first sensor observation is acquired. The first sensor observation can be acquired by the sensor system 125. More particularly, the first sensor observation can be performed using one or more radar sensors 127 and one or more lidar sensors 128. The first sensor observation can be acquired from a forward portion of the driving environment 500 that includes the pole 530 and the other vehicle 520. The first sensor observation can include radar data for the dynamic object and the stationary object. The first sensor observation can include lidar data for the dynamic object and the stationary object.

A first identifier ID1 can be assigned to the radar data for the other vehicle 520. A second identifier ID2 can be assigned to the radar data for the pole 530. The first identifier ID1 is different than the second identifier ID2. Such assigning can be performed by the sensor identifier consistency module 141, the processor 110, the sensor system 125, the one or more radar sensors 127, and/or one or more other modules or elements.

In one or more arrangements, once an identifier is assigned to the radar data for a particular object, the same identifier can be assigned the radar data for that object in all subsequent sensor observations. In this example, if the first identifier ID1 is assigned to the radar data for the vehicle 520, then only the first identifier ID1 is assigned to the radar data for the vehicle 520 at subsequent detection points.

The sensor identifier consistency module 141 can be configured to associate lidar sensor data with radar sensor data. However, the sensor identifier consistency module 141 can be configured to associate the lidar data of the vehicle 520 with only radar data with the first identifier ID1 assigned thereto. Likewise, the sensor identifier consistency module 141 can be configured to associate the lidar data of the pole 530 with only radar data with the second identifier ID2 assigned thereto.

For the first sensor observation, the lidar data of the vehicle 520 can be associated with the radar data having the first identifier ID1 assigned thereto. Further, for the first sensor observation, the lidar data of the pole 530 can be associated with the radar data having the second identifier assigned thereto.

Figure 5B:
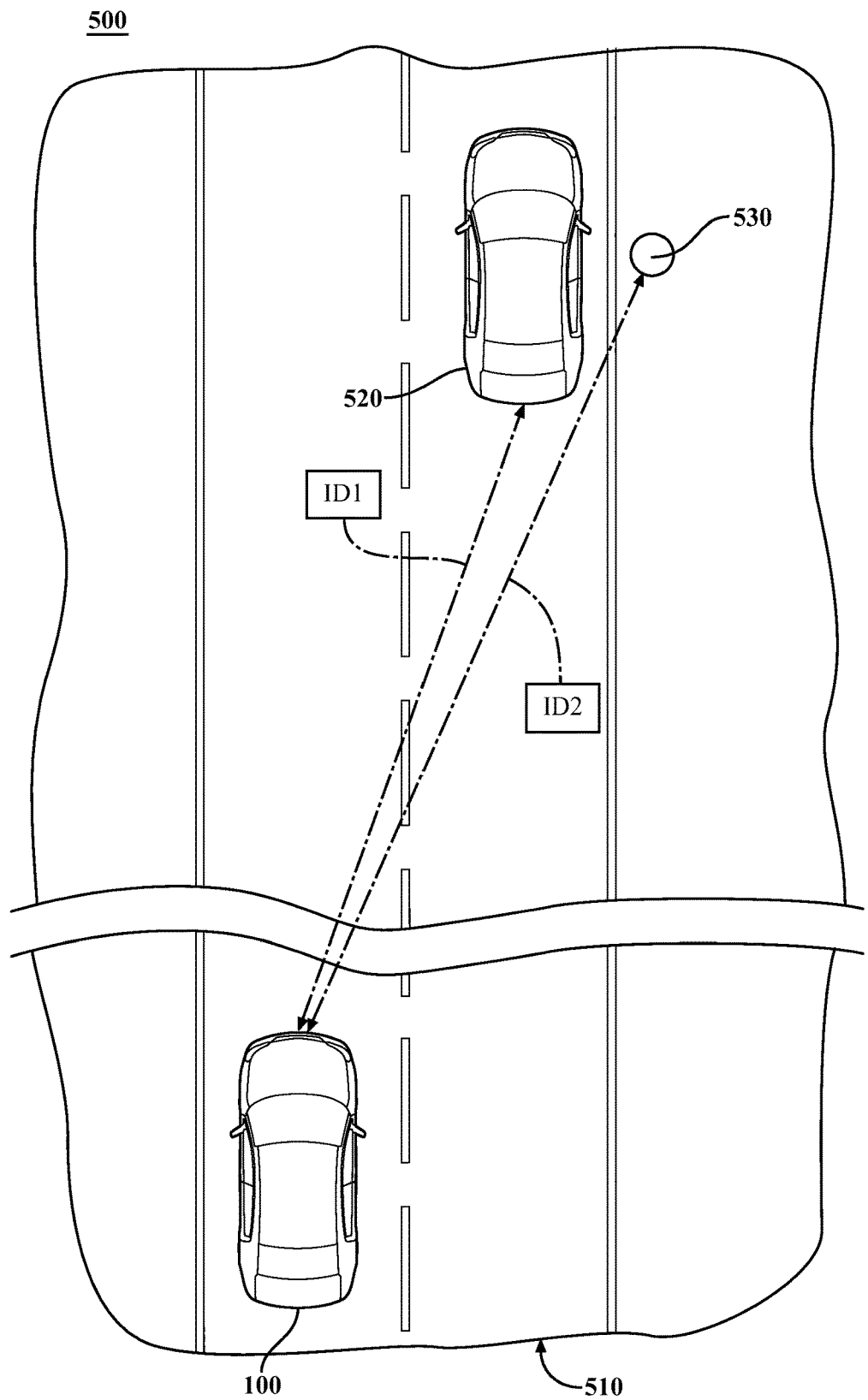
FIG. 5B is an example of the driving environment during a second subsequent sensor observation for the autonomous vehicle, wherein the same identifiers are assigned to stationary and dynamic objects in the driving environment.

When the vehicle 520 is located closer to the pole 530, as is shown in FIG. 5B, it may be difficult to properly associate lidar data and radar data. However, the assignment of the unique identifiers to the radar data associated with each object in the environment can minimize the likelihood of incorrect associations between lidar and radar sensor data.

FIG. 5B shows the driving environment 500 when a second sensor observation is acquired. The second sensor observation can occur subsequent to the first sensor observation. The second sensor observation can be acquired by the sensor system 125. The vehicle 100 can sense a forward portion of the driving environment 500 that includes the pole 530 and the other vehicle 520. The other vehicle 520 can be located substantially near the determined location of the stationary object. For instance, the other vehicle 520 can be passing by the pole 530. In such case, due to the lateral inaccuracy of radar sensors, the assignment of the identifiers may become unreliable and may result in incorrect sensor data associations.

However, according to arrangements described herein, the incorrect sensor data associations are avoided. For the second sensor observation, the lidar data of the vehicle 520 can be associated with only radar data with the first identifier assigned thereto. Thus, if radar data has an identifier other than the first identifier ID1, then such radar data will not be associated with the lidar data of the dynamic object.

It will be appreciated that arrangements described herein can provide numerous benefits, including one or more of the benefits mentioned herein. For example, arrangements described herein can improve the performance of an autonomous vehicle by reducing, avoiding, or eliminating false associations of stationary objects with dynamic objects in a driving environment. By detecting such objects, the autonomous vehicle can make smooth driving maneuvers well in advance of encountering such objects. Arrangements described herein can improve safety and/or performance of autonomous vehicles by avoiding sudden or drastic driving maneuvers (e.g., hard breaks, swerves, etc.) that may arise based on incorrect associations of sensor data. Arrangements described herein can improve safety and/or performance of autonomous vehicles by avoiding collisions with stationary objects along a road (e.g., parked or stopped vehicles on a road or on a side of the road). Further, arrangements described herein can increase the overall comfort level of vehicle occupants.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of minimizing incorrect associations of sensor data for an autonomous vehicle, the autonomous vehicle operating in a driving environment, a stationary object and a dynamic object being located in a forward portion of the driving environment, the method comprising:

acquiring, using at least a radar sensor, a first sensor observation of the forward portion of the driving environment in which the dynamic object is located away from the stationary object, the first sensor observation including radar data for the dynamic object and the stationary object, acquiring the first sensor observation including:

transmitting one or more radar signals into the forward portion of the driving environment;

receiving one or more reflections of the one or more transmitted radar signals, whereby the one or more radar signals are reflected off of objects in the driving environment;

determining the location of the stationary object in the driving environment based on the radar data;

acquiring, using at least the radar sensor and a lidar sensor, a second sensor observation of the forward portion of the driving environment in which the dynamic object is located substantially near the determined location of the stationary object, the second sensor observation including radar data and lidar data for the dynamic object and the stationary object, the second sensor observation being subsequent to the first sensor observation, acquiring the second sensor observation including:

transmitting one or more radar signals into the forward portion of the driving environment;

receiving one or more reflections of the one or more transmitted radar signals, whereby the one or more radar signals are reflected off of objects in the driving environment;

transmitting one or more lidar signals into the forward portion of the driving environment;

receiving one or more reflections of the one or more transmitted lidar signals, whereby the one or more lidar signals are reflected off of objects in the driving environment; and for the second sensor observation, preventing the lidar data of the dynamic object from being associated with radar data obtained substantially at the determined location of the stationary object.

2. The method of claim 1, wherein acquiring a first sensor observation of the forward portion of the driving environment in which the dynamic object is located away from the stationary object includes:

acquiring a plurality of sensor observations of the forward portion of the driving environment in which the dynamic object is located away from the stationary object; wherein the plurality of sensor observations includes radar data for the dynamic object and the stationary object; and for the plurality of sensor observations, determining the location of the stationary object in the driving environment based at least in part on the radar data.

3. The method of claim 1, wherein the radar data includes speed data and location data, and wherein preventing the lidar data of the dynamic object from being associated with radar data obtained substantially at the determined location of the stationary object includes preventing the lidar data of the dynamic object from being associated with at least the speed data from the radar data obtained near the determined location of the stationary object.

4. The method of claim 1, further including:

determining a driving maneuver for the autonomous vehicle based at least partially on the lidar data of the dynamic object that is prevented from being associated with radar data obtained substantially at the determined location of the stationary object.

5. A method of minimizing incorrect associations of sensor data for an autonomous vehicle, the autonomous vehicle operating in a driving environment, a stationary object and a dynamic object being located in a forward portion of the driving environment, the method comprising:

acquiring a first sensor observation of the forward portion of the driving environment in which the dynamic object is located away from the stationary object, the first sensor observation including radar data for the dynamic object and the stationary object;

determining the location of the stationary object in the driving environment based on the radar data;

acquiring a second sensor observation of the forward portion of the driving environment in which the dynamic object is located substantially near the determined location of the stationary object, the second sensor observation including radar data and lidar data for the dynamic object and the stationary object, the second sensor observation being subsequent to the first sensor observation;

for the second sensor observation, preventing the lidar data of the dynamic object from being associated with radar data obtained substantially at the determined location of the stationary object;

determining a driving maneuver for the autonomous vehicle based at least partially on the lidar data of the dynamic object that is prevented from being associated with radar data obtained substantially at the determined location of the stationary object; and causing the autonomous vehicle to implement the determined driving maneuver.

6. The method of claim 5, wherein acquiring the first sensor observation of the forward portion of the driving environment is performed using at least a radar sensor, and wherein acquiring the second sensor observation of the forward portion of the driving environment is performed using at least a radar sensor and a lidar sensor.

7. A system for minimizing incorrect associations of sensor data for an autonomous vehicle, the autonomous vehicle operating in a driving environment, a stationary object and a dynamic object being located in a forward portion of the driving environment, the system comprising:

a sensor system including a radar sensor and a lidar sensor, the sensor system being configured to:

acquire, using at least the radar sensor, a first sensor observation of a forward portion of the driving environment in which the dynamic object is located away from the stationary object, the first sensor observation including radar data for the dynamic object and the stationary object, acquiring the first sensor observation including:

transmitting one or more radar signals into the forward portion of the driving environment;

receiving one or more reflections of the one or more transmitted radar signals, whereby the one or more radar signals are reflected off of objects in the driving environment; and acquire, using at least the radar sensor and the lidar sensor, a second sensor observation of the forward portion of the driving environment in which the dynamic object is located substantially near the stationary object, the second sensor observation including radar data and lidar data for the dynamic object and the stationary object, the second sensor observation being subsequent to the first sensor observation, acquiring the second sensor observation including:

transmitting one or more radar signals into the forward portion of the driving environment;

receiving one or more reflections of the one or more transmitted radar signals, whereby the one or more radar signals are reflected off of objects in the driving environment;

transmitting one or more lidar signals into the forward portion of the driving environment;

receiving one or more reflections of the one or more transmitted lidar signals, whereby the one or more lidar signals are reflected off of objects in the driving environment; and a processor operatively connected to the sensor system, the processor being programmed to initiate executable operations including:

for the first sensor observation, determining the location of the stationary object in the driving environment based on the radar data; and for the second sensor observation, preventing the lidar data of the dynamic object from being associated with radar data obtained substantially at the determined location of the stationary object.

8. The system of claim 7, wherein acquiring a first sensor observation of the forward portion of the driving environment in which the dynamic object is located away from the stationary object includes:

acquiring a plurality of sensor observations of the forward portion of the driving environment in which the dynamic object is located away from the stationary object; wherein the plurality of sensor observations includes radar data for the dynamic object and the stationary object; and for the plurality of sensor observations, determining the location of the stationary object in the driving environment based at least in part on the radar data.

9. The system of claim 7, wherein the radar data includes speed data and location data, and wherein preventing the lidar data of the dynamic object from being associated with radar data obtained substantially at the determined location of the stationary object includes preventing the lidar data of the dynamic object from being associated with at least the speed data from the radar data obtained substantially at the determined location of the stationary object.

10. The system of claim 7, wherein the executable operations further include:

determining a driving maneuver for the autonomous vehicle based at least partially on the lidar data of the dynamic object that is prevented from being associated with radar data obtained substantially at the determined location of the stationary object.

11. A system for minimizing incorrect associations of sensor data for an autonomous vehicle, the autonomous vehicle operating in a driving environment, a stationary object and a dynamic object being located in a forward portion of the driving environment, the system comprising:

a sensor system including a radar sensor and a lidar sensor, the sensor system being configured to:

acquire a first sensor observation of a forward portion of the driving environment in which the dynamic object is located away from the stationary object, the first sensor observation including radar data for the dynamic object and the stationary object; and acquire a second sensor observation of the forward portion of the driving environment in which the dynamic object is located substantially near the stationary object, the second sensor observation including radar data and lidar data for the dynamic object and the stationary object, the second sensor observation being subsequent to the first sensor observation; and a processor operatively connected to the sensor system, the processor being programmed to initiate executable operations including:

for the first sensor observation, determining the location of the stationary object in the driving environment based on the radar data;

for the second sensor observation, preventing the lidar data of the dynamic object from being associated with radar data obtained substantially at the determined location of the stationary object;
determining a driving maneuver for the autonomous vehicle based at least partially on the lidar data of the dynamic object that is prevented from being associated with radar data obtained substantially at the determined location of the stationary object; and
causing the autonomous vehicle to implement the determined driving maneuver.

12. The system of claim 11, wherein acquiring the first sensor observation of the forward portion of the driving environment is performed using at least a radar sensor, and wherein acquiring the second sensor observation of the forward portion of the driving environment is performed using at least a radar sensor and a lidar sensor.

13. A method of minimizing incorrect associations of sensor data for an autonomous vehicle, the autonomous vehicle operating in a driving environment, a stationary object and a dynamic object being located in a forward portion of the driving environment, the method comprising:
acquiring, using at least a radar sensor and a lidar sensor, a first sensor observation of the forward portion of the driving environment, the first sensor observation including radar data and lidar data for the dynamic object and the stationary object, a first identifier being assigned to the radar data for the dynamic object and a second identifier being assigned to the radar data for the stationary object, acquiring the first sensor observation including:
transmitting one or more radar signals into the forward portion of the driving environment;
receiving one or more reflections of the one or more transmitted radar signals, whereby the one or more radar signals are reflected off of objects in the driving environment;
transmitting one or more lidar signals into the forward portion of the driving environment;
receiving one or more reflections of the one or more transmitted lidar signals, whereby the one or more lidar signals are reflected off of objects in the driving environment;
for the first sensor observation, associating the lidar data of the dynamic object with the radar data having the first identifier assigned thereto;
for the first sensor observation, associating the lidar data of the stationary object with the radar data having the second identifier assigned thereto;
acquiring, using at least the radar sensor and the lidar sensor, a second sensor observation of the forward portion of the driving environment, the second sensor observation including radar data and lidar data for the dynamic object and the stationary object, the second sensor observation being subsequent to the first sensor observation, the first identifier being assigned to the radar data for the dynamic object and the second identifier being assigned to the radar data for the stationary object, acquiring the second sensor observation including:
transmitting one or more radar signals into the forward portion of the driving environment;
receiving one or more reflections of the one or more transmitted radar signals, whereby the one or more radar signals are reflected off of objects in the driving environment;
transmitting one or more lidar signals into the forward portion of the driving environment; and
receiving one or more reflections of the one or more transmitted lidar signals, whereby the one or more lidar signals are reflected off of objects in the driving environment; and
for the second sensor observation, associating the lidar data of the dynamic object with only radar data with the first identifier assigned thereto.

14. The method of claim 13, further including:
determining a driving maneuver for the autonomous vehicle based at least partially on the lidar data of the dynamic object with only radar data with the first identifier assigned thereto.

15. The method of claim 14, wherein the driving maneuver is a movement of the autonomous vehicle in the lateral direction relative to the dynamic object.

16. A method of minimizing incorrect associations of sensor data for an autonomous vehicle, the autonomous vehicle operating in a driving environment, a stationary object and a dynamic object being located in a forward portion of the driving environment, the method comprising:
acquiring a first sensor observation of the forward portion of the driving environment, the first sensor observation including radar data and lidar data for the dynamic object and the stationary object, a first identifier being assigned to the radar data for the dynamic object and a second identifier being assigned to the radar data for the stationary object;
for the first sensor observation, associating the lidar data of the dynamic object with the radar data having the first identifier assigned thereto;
for the first sensor observation, associating the lidar data of the stationary object with the radar data having the second identifier assigned thereto;
acquiring a second sensor observation of the forward portion of the driving environment, the second sensor observation including radar data and lidar data for the dynamic object and the stationary object, the second sensor observation being subsequent to the first sensor observation, the first identifier being assigned to the radar data for the dynamic object and the second identifier being assigned to the radar data for the stationary object;
for the second sensor observation, associating the lidar data of the dynamic object with only radar data with the first identifier assigned thereto;
determining a driving maneuver for the autonomous vehicle based at least partially on the lidar data of the dynamic object with only radar data with the first identifier assigned thereto; and
causing the autonomous vehicle to implement the determined driving maneuver.

17. A system for minimizing incorrect associations of sensor data for an autonomous vehicle, the autonomous vehicle operating in a driving environment, a stationary object and a dynamic object being located in a forward portion of the driving environment, the system comprising:
a sensor system including a radar sensor and a lidar sensor, the sensor system being configured to:
acquire, using at least the radar sensor and the lidar sensor, a first sensor observation of the forward portion of the driving environment, the first sensor observation including radar data and lidar data for the dynamic object and the stationary object, a first identifier being assigned to the radar data for the dynamic object and a second identifier being assigned to the radar data for the stationary object, acquiring the first sensor observation including:

transmitting one or more radar signals into the forward portion of the driving environment;
receiving one or more reflections of the one or more transmitted radar signals, whereby the one or more radar signals are reflected off of objects in the driving environment;
transmitting one or more lidar signals into the forward portion of the driving environment;
receiving one or more reflections of the one or more transmitted lidar signals, whereby the one or more lidar signals are reflected off of objects in the driving environment;
acquire, using at least the radar sensor and the lidar sensor, a second sensor observation of the forward portion of the driving environment, the second sensor observation including radar data and lidar data for the dynamic object and the stationary object, the second sensor observation being subsequent to the first sensor observation, the first identifier being assigned to the radar data for the dynamic object and the second identifier being assigned to the radar data for the stationary object, acquiring the second sensor observation including:
transmitting one or more radar signals into the forward portion of the driving environment;
receiving one or more reflections of the one or more transmitted radar signals, whereby the one or more radar signals are reflected off of objects in the driving environment;
transmitting one or more lidar signals into the forward portion of the driving environment; and
receiving one or more reflections of the one or more transmitted lidar signals, whereby the one or more lidar signals are reflected off of objects in the driving environment; and
a processor operatively connected to the sensor system, the processor being programmed to initiate executable operations comprising:
for the first sensor observation, associating the lidar data of the dynamic object with the radar data having the first identifier assigned thereto;
for the first sensor observation, associating the lidar data of the stationary object with the radar data having the second identifier assigned thereto; and
for the second sensor observation, associating the lidar data of the dynamic object with only radar data with the first identifier assigned thereto.

18. The system of claim 17, wherein the executable operations further include:

determining a driving maneuver for the autonomous vehicle based at least partially on the lidar data of the dynamic object and the radar data with the first identifier assigned thereto.

19. The system of claim 18, wherein the driving maneuver is a movement of the autonomous vehicle in a lateral direction relative to the dynamic object.

20. A system for minimizing incorrect associations of sensor data for an autonomous vehicle, the autonomous vehicle operating in a driving environment, a stationary object and a dynamic object being located in a forward portion of the driving environment, the system comprising:
a sensor system including a radar sensor and a lidar sensor, the sensor system being configured to:
acquire a first sensor observation of the forward portion of the driving environment, the first sensor observation including radar data and lidar data for the dynamic object and the stationary object, a first identifier being assigned to the radar data for the dynamic object and a second identifier being assigned to the radar data for the stationary object;
acquire a second sensor observation of the forward portion of the driving environment, the second sensor observation including radar data and lidar data for the dynamic object and the stationary object, the second sensor observation being subsequent to the first sensor observation, the first identifier being assigned to the radar data for the dynamic object and the second identifier being assigned to the radar data for the stationary object;
a processor operatively connected to the sensor system, the processor being programmed to initiate executable operations comprising:
for the first sensor observation, associating the lidar data of the dynamic object with the radar data having the first identifier assigned thereto;
for the first sensor observation, associating the lidar data of the stationary object with the radar data having the second identifier assigned thereto;
for the second sensor observation, associating the lidar data of the dynamic object with only radar data with the first identifier assigned thereto;
determining a driving maneuver for the autonomous vehicle based at least partially on the lidar data of the dynamic object and the radar data with the first identifier assigned thereto; and
causing the autonomous vehicle to implement the determined driving maneuver.

* * * * *